Figures 1, 2:
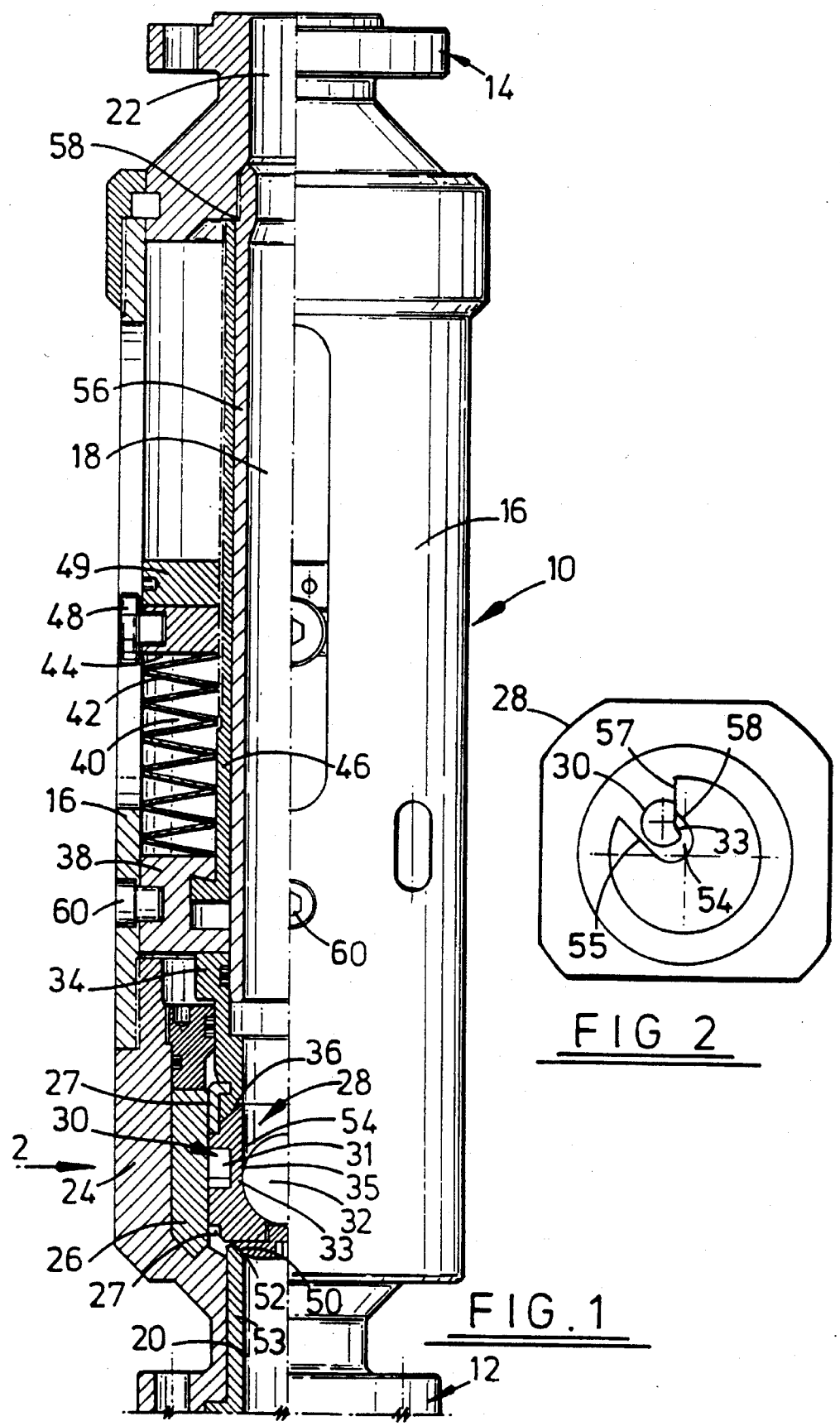

United States Patent

Coutts et al.

Patent Number: 5,501,242
Date of Patent: Mar. 26, 1996

[54] PRESSURE RELIEF VALVE

[75] Inventors: Graeme F. Coutts; Jeffrey C. Edwards, both of Aberdeen, Scotland

[73] Assignee: Expro North Sea Limited, Scotland

[21] Appl. No.: 360,750

[22] PCT Filed: May 27, 1993

[86] PCT No.: PCT/GB93/01110

§ 371 Date: Mar. 13, 1995

§ 102(e) Date: Mar. 13, 1995

[87] PCT Pub. No.: WO94/00709

PCT Pub. Date: Jan. 6, 1994

[30]     Foreign Application Priority Data

Jun. 24, 1992 [GB] United Kingdom ............... 9213371

[51] Int. Cl.⁶ .................................................. F16K 15/04
[52] U.S. Cl. ........................ 137/1; 137/511; 137/539
[58] Field of Search ................................. 137/494, 511, 137/1, 528, 539

[56]             References Cited

U.S. PATENT DOCUMENTS

| 2,959,187 | 11/1960 | Boyle | 137/456 |
| 3,780,809 | 12/1973 | Ayers, Jr. et al. | 166/314 |
| 4,248,265 | 2/1981 | Freeman, Jr. | 137/494 |
| 4,262,693 | 4/1981 | Giebeler | 137/494 |
| 4,377,179 | 3/1983 | Giebeler | 137/494 |
| 4,565,213 | 1/1986 | Giebeler | 137/494 |
| 4,930,553 | 6/1990 | Grillo | 137/508 |

FOREIGN PATENT DOCUMENTS

| 0055960 | 7/1982 | European Pat. Off. |  |
| 0221713 | 5/1987 | European Pat. Off. |  |
| 2491185 | 4/1982 | France |  |
| 1679109 | 9/1991 | U.S.S.R. | 137/511 |
| WO9303255 | 2/1993 | WIPO |  |
| WO9305273 | 3/1993 | WIPO |  |

*Primary Examiner*—John Rivell
*Attorney, Agent, or Firm*—Gifford, Krass, Groh, Sprinkle, Patmore, Anderson & Citkowski

[57]            ABSTRACT

A pressure relief valve includes an apertured ball valve element which is spring loaded and is rotatably and axially mounted in the valve bore so that when an over pressure situation arises fluid forces the ball axially off the valve seat against the force of a spring and causes the ball valve to rotate such that the aperture in the ball valve connects the inlet bore and outlet bore of the valve housing so that fluid can flow through the pressure relief valve. When pressure at the inlet falls beneath a predetermined value, the spring forces the ball to rotate and move back against the valve seat, thus closing the valve. With this arrangement there is minimal pressure exerted on the valve housing and the valve will operate with a back pressure up to 50% of the inlet pressure. This means that much smaller bore outlet piping can be used with a savings in weight and, consequently, cost.

10 Claims, 1 Drawing Sheet

PRESSURE RELIEF VALVE

The present invention relates to a pressure relief valve particularly, but not exclusively, for use with pipelines carrying fluid at a predetermined pressure above which the fluid requires to be vented so as to reduce pressure in the system to a level beneath the predetermined threshold. In particular, the pressure relief valve is for use in hydrocarbon production exploration industries and similar pressurised fluid environments.

Hydrocarbon fluid in a well test or well production environment is maintained initially at pressure substantially higher than atmosphere. The pipeline containing the pressurised hydrocarbon fluid usually contains a piece of equipment, such as a safety valve, such that if an over-pressure situation occurs the well fluid is vented to atmosphere via a oil rig pressure relief burner boom. Such pressure relief valves have been available for many years and one common type is a flanged pressure relief valve which is spring-loaded and which is coupled to the hydrocarbon pipeline. In the event of an over-pressure situation arising, a valve closure member is forced from a valve seat, against a spring force to open the valve, whereby pressurised fluid is allowed to flow through a valve outlet. A typical type of prior art valve is a Crosby spring-loaded flanged pressure relief valve style JOS and JBS. Although these types of valve are common in the industry, they suffer from a number of disadvantages. One significant disadvantage of this type of valve is that a back-pressure at the valve outlet of approximately 10% of the inlet pressure is sufficient to act together with a spring force to close the valve leading to a potentially hazardous situation. In addition, the top housing which contains the spring element is rated at 120 p.s.i. which is believed insufficient to use with a large range of pressures commonly encountered in hydrocarbon process equipment. In order for the valve to be used such that the outlet pressure is less than 10% of the inlet pressure large diameter piping is required at the outlet. This piping is not only heavy, but is also relatively expensive. A further consequence of the weight of the piping is that in the production and exploration structure at least 9 times the amount of piping weight requires to be added for structural considerations. Therefore, where considerable amount of piping is required, as is common in oil exploration and production platforms, this can result in a significant add-on cost in terms of weight and overall structural costs as a consequence of having to use large diameter piping to reduce the pressure relief valve back-pressure. A further disadvantage of the aforementioned prior art valves is that most of the valve closure elements are of the plate type which can result in hydrate formation as the gas expands and cools in the nozzle because of the throttling effect. If this happens and venting does not occur, the line pressure is retained and the well test equipment is likely to fail at the next weakest point which is probably the piece of equipment which the valve is intended to protect.

A further disadvantage of existing prior art relief valves is that it is not possible to test the valve in situ. The system requires to be closed down, the valve physically removed and tested and then re-inserted into the process equipment. It will be appreciated that this is an extremely time-consuming and expensive operation, especially on exploration and production rigs, which add significantly to the cost of operating the rig. Yet another disadvantage of the prior art pressure relief valves is that with a plate valve fluid impinges on the valve nozzle and the valve plate, with the result that the nozzle and the plate can wear, thus rendering the valve susceptible to leakage in the absence of an over-pressure situation which is, of course, undesirable.

Another type of pressure relief valve is a balanced bellows type valve which is used to isolate the back pressure from the top of the disc with the effective area of the bellows being equal to the seat area. Therefore, although this type of valve is claimed to operate with back pressures up to 50% of gauge pressure at set pressures of 100 psig or greater at present. Such valves are incapable of withstanding back pressures in excess of 200 psig, therefore, large relief systems are still required to maintain the pressure relief below this. Another type of pressure relief valve mentioned in ANSI Standard B951 is pilot-operated valves and although these valves have no back pressure limitations, they are not widely used in the industry because of complexity of design and the possibility of increased system failure.

An object of the present invention is to provide a pressure relief valve which obviates or mitigates at least one of the aforementioned disadvantages of the prior art.

This is achieved by providing a pressure relief valve having an apertured ball valve element which is spring-loaded and which is rotatably and axially mounted in the valve bore so that when an over-pressure situation arises fluid forces the ball off a ball valve seat against a spring force and causes the ball valve to rotate such that the aperture in the ball valve connects the inlet bore and outlet bore of a valve housing so that fluid can flow through the pressure relief valve. When pressure at the inlet falls beneath a predetermined value, the spring force forces the ball to rotate and move back against the valve seat, thus closing the valve.

With this arrangement there is minimal pressure exerted on the valve housing and the valve will operate with a back-pressure up to 50% of the inlet pressure. This means that much smaller bore outlet piping can be used with savings in weight and, consequently, cost. For example, 3 in. piping may be used instead of 8 in. or larger piping for the equivalent rated valves.

According to one aspect of the present invention there is provided a pressure relief valve for relieving pressure above a predetermined value in fluid flow lines, said pressure relief valve comprising:

a valve housing defining a through-bore with a bore inlet and a bore outlet, a ball valve element mounted in said bore, said ball valve element having a through-aperture, and being mounted on said bore such that said ball valve element is rotatable and axially moveable within said bore, said ball valve element being coupled to spring means biased to urge said ball valve element into a closed position, the arrangement being such that in response to fluid at said bore inlet exceeding a predetermined pressure, said ball valve is axially moved off a valve seat against said spring force and rotated such that said through bore allows fluid communication between said bore inlet and said bore outlet, and when fluid pressure at said bore inlet falls beneath said predetermined level said spring means providing a restoring force to rotate and axially move said ball valve element onto said valve seat to close said pressure relief valve.

Preferably, said spring means is adjustable so that the predetermined pressure at which the ball valve element is moved is variable. Conveniently, the pressure relief valve means includes test coupling means for coupling to valve test apparatus by which the valve operation can be tested in situ.

Preferably, the area of the valve seat is exactly the same as the area of the seat seal.

Preferably, the spring means is provided by Belleville washers the properties of which are selected to give a selected response to predetermined inlet pressure values.

Preferably also, the ball valve element is coupled to the spring means by means of a cylindrical piston located between said ball valve element and a spring-pusher and which is axially moveable within said valve housing.

Conveniently, the ball valve element in the housing bore has machined slots of a predetermined shape which are mounted on camming spigots such that as the valve is moved off the valve seat axially in response to inlet pressure above a predetermined threshold, it is simultaneously rotated such that at the full open position, the aperture of the ball element is aligned with the inlet and outlet bores. Conveniently, the ball valve element seals are made of beryllium copper. Conveniently, the ball valve element is displaced by a very small amount, such as 0.2 in., before it starts to rotate and is rotated to a fully open position when displaced axially by 0.635 in.

These and other aspects of the invention will become apparent from the following description, when taken in combination with the accompanying drawings in which:

FIG. 1 is a longitudinal split sectional view through a pressure relief valve in accordance an embodiment of the present invention, and FIG. 2 is an enlarged side view of the ball valve element taken in the direction of arrow 2 shown in FIG. 1.

Reference is made to the drawing which depicts a pressure relief valve, generally indicated by reference numeral 10, having a valve inlet flange 12 and a valve outlet flange 14 for connection to inlet and outlet piping, which are not shown in the interests of clarity. The valve 10 has a valve housing generally indicated by reference numeral 16 which defines the longitudinal valve bore 18 which extends throughout the length of the valve element such that when the pressure relief valve is open, as will be later described, the valve bore is in communication with a bore inlet 20 at the inlet flange and bore outlet 22 at the outlet flange so that fluid can flow through the valve and relieve excess pressure in fluid pipeline.

The valve housing 16 has a lower or inlet bush 24 into which is fixed a cylindrical ball valve element carrier 26. A ball valve element 28 is disposed in the bore 18 and is rotatably mounted on spigots 30 of carrier 26 and carrying brackets 27 (one of which is shown) which is a plate with a circular cut-out for receiving a machined circular slot 29 (FIG. 2) of the ball element 28 such that the ball can be rotated and moved axially between an open and a closed position as will be later described in detail. The ball valve element 28 has through-aperture 32 which is of substantially the same diameter as the bore 18 such that when the ball valve is fully open, the through channel 32 is aligned with the bore 18 such that there is a continuous bore between the inlet bore 20 and the outlet bore A cylindrical piston 34 is disposed in the valve housing and the top surface of the piston is shaped to abut the spherical surface portion 36 of the ball valve element 28. The piston is, as will be later described, axially moveable within said housing and abuts a spring-pusher 38.

A biasing spring 40 in the form of a plurality of Belleville washers 42 arranged as shown is disposed in a chamber 44 defined between the exterior of the housing 16 and a spring carrier 46 which is secured within the housing 16. The spring is contained in chamber 44 by means of the spring-pusher 38 and an adjustable stop 48. The adjustable stop 48 can be used to test the operation of the pressure relief valve in situ, as will be later described in detail. The adjustable stop is secured in position thus, in turn, confining the spring 42 within the chamber 44 as shown.

The ball valve element 28 has a valve seat 50 which abuts a similar annular valve seat 52 of the annular cylinder 54, the interior surface of which defines inlet bore 20. It will be seen that there is clearance between each ball element spigot 30 and spigot locating slot 54 such that the ball valve element 28 can be moved axially within the housing. Each spigot 30 has a cylindrical portion 31 and a conical portion 33 which fits into the slot 54 which is best seen in FIG. 2. The slot (54) has an outside track (55) and an inside track (58). The outside track (55) acts upon the cylindrical portion (31) of the spigot 30 and rotates the valve open and correspondingly the inside track (58) acts upon the opposite side (33) of the spigot (30) and rotates the valve to the closed position. The upper area of the inside track (57) allows the valve element to move axially relative to the spigot (30) prior to rotation of the element.

In operation, the pressure relief valve 10 is coupled to an inlet pipe and an outlet pipe (not shown) and when the fluid pressure in the inlet pipe, which enters bore 20 and presses on the valve element 28, is sufficient to force the valve element axially along the bore 18 against the spring force of the biasing washer spring 40, the seal 50,52 between the spherical valve seat and annular seal is broken as the ball valve element 28 moved axially along bore 18 which is allowed by the track 57 moving past flat surface 35. The spigot 30 performs a camming function such that, after the ball valve element is moved by 0.2 in., the element 28 is simultaneously rotated about the spigots 30 such that the aperture 32 turns into alignment with the bore 18. When the ball valve is fully open, that is it is moved 0.635 in., the aperture 32 is in alignment with the bore 18 and fluid communicates through the valve 10 from the inlet bore 20 through bore 18 to the outlet bore 22 and to any pipe coupled to the outlet flange 14. Pressure is exerted on the biasing spring 40 by means of the annular piston 34 acting on the spring-pusher 38. The Belleville washers are Mubea disc springs of the type such as C22,5 GR1 which has a regressive force deflection curve. This means that the force deflection curve is not linear and that at a certain force a smaller increase in force, for example, 400N an increase of 50N provides about a 2.5 mm deflection whereas at 100N an increase of 50N gives about a 0.5 mm deflection. This means that the spring force can be fine tuned to enable the valve to be actuated at predetermined pressures at the valve inlet 20. When the valve is open, fluid rushes through the valve 10 to the outlet pipework to be vented. The interior of the bore 18 is slightly constricted by the internal bore tube 56 which forms a nozzle 58 near the outlet. It will be appreciated that because this nozzle is displaced from the valve element any hydration or freezing of well fluid will not affect the operation of the valve element.

When pressure at the inlet falls beneath the predetermined level, the biasing spring 40 acts on the spring-pusher 38 and the annular piston 34 to urge the ball valve element 36 axially towards the inlet 12. As the valve element is urged in this direction it is rotated because of the spigot/slot arrangement as before so that the aperture 32 is rotated through 90° to the position shown in the drawing. In this position, the valve seats 50,52 are again in contact and the valve is effectively closed.

Thus, it will be appreciated that with the afore-described embodiment of pressure relief valve various advantages are provided over the aforementioned prior art. In particular, back-pressure has nominal affect on the valve element, this being driven by the biasing spring means which is effectively separated from the bore, unlike the prior art. Therefore, the valve is able to operate with up to 50% backpressure which means that the outlet pipe bore is very much smaller for a given pressure relief requirement providing savings in weight and, of course, cost. This results in a similar weight saving in the structure further improving cost savings. A further advantage is that the nozzle is removed from the valve element so that there is minimal wear of the valve seat and valve element due to fluid flow, unlike the prior art.

In addition, the adjustable stop 48 can be coupled to an external hydraulic test jig which can be used to test the operation of the valve in situ which has hitherto not been possible with existing valves. The set pressure of the valve is checked by locating hydraulic jig (not shown) on the lower valve body and the adjustable stop 48. Ideally the hydraulic area of the jig is equal to that of the annular valve seat 50. Therefore by the application of hydraulic pressure to the jig until the springs 40 begin to compress would provide a reliable indication of the cracking pressure of the valve. Increasing the pressure until the jig and springs had moved by circa 0.625" (full travel equivalent to full open position) would provide a reliable indication of the full valve open pressure. To set the valve at the required pressure a lock ring 49 can be adjusted to abut the stop 48 and therefore maintain the stop 48 in the correct position. For the purpose of safety a mechanism is provided (not shown) to enable the stop to be locked by either a lead seal or padlock. A plug 60 can be located in the housing as shown to secure the spring pusher 38 to facilitate transport of the multi-sensor relief valve. The plug 60 is of course removed when the valve is in situ to facilitate operation.

Various modifications may be made to the embodiment hereinbefore described without departing from the scope of the invention. For example, more than one valve spring may be used disposed at various positions around the periphery of the valve housing. The seals may be made of any other suitable material than beryllium copper and the spring means could be a coil spring instead of Belleville washers or any other suitable resilient material which could be tuned to provide the suitable valve opening and valve closing positions.

We claim:

1. A pressure relief valve for relieving pressure above a predetermined value in fluid flow lines, said pressure relief valve comprising:

a valve housing defining a through-bore with a bore inlet and a bore outlet, said bore inlet including a valve seat, a ball valve element mounted in said bore, said ball valve element having a through-aperture, and being mounted in said bore such that said ball valve element is rotatable and axially moveable within said bore, spring means coupled to said ball valve element and biased to urge said ball valve element into a closed position, said ball valve being responsive to fluid at said bore inlet exceeding a predetermined pressure to axially move to an open position off said valve seat against said spring force and rotate such that said through bore allows fluid communication between said bore inlet and said bore outlet, and when fluid pressure at said bore inlet falls beneath said predetermined level said spring means providing a restoring force to rotate and axially move said ball valve element onto said valve seat to close said pressure relief valve.

2. A pressure relief valve as claimed in claim 1 wherein said spring means is adjustable so that the predetermined pressure at which the ball valve element is moved is variable.

3. A pressure relief valve as claimed in claim 1 wherein the pressure relief valve includes test coupling means for coupling to valve test apparatus by which the valve operation can be tested in situ.

4. A pressure relief valve as claimed in claim 1 wherein the area of the valve seat is exactly the same as the area of the seat seal.

5. A pressure relief valve as claimed in claim 1 wherein the spring means comprises a plurality of Belleville washers, the properties of which are selected to give a selected response to predetermined inlet pressure values.

6. A pressure relief valve as claimed in claim 1 further comprising a cylindrical piston having a first end abutting said ball valve element and a spring-pusher interposed between a second end of said cylindrical piston and said spring means, to couple said spring means to said ball valve element, said spring pusher being axially moveable within said valve housing.

7. A pressure relief valve as claimed in claim 1 wherein the housing further includes a plurality of camming spigots and the ball valve element in the housing bore further includes a plurality of machined slots of a predetermined shape which are mounted on said camming spigots such that as the ball valve element is moved off the valve seat axially in response to inlet pressure above a predetermined threshold, said ball valve element is simultaneously rotated such that at the open position, the aperture of the ball valve element is aligned with the bore inlet and the bore outlet.

8. A pressure relief valve as claimed in claim 1 wherein said valve further includes ball valve element seals made of beryllium copper.

9. A pressure relief valve as claimed in claim 1 wherein the ball valve element is axially displaced approximately 0.2 in. before it starts to rotate and is rotated to a fully open position when displaced axially by about 0.635 in.

10. A method of relieving pressure above a predetermined value in fluid flow lines comprising the steps of, applying a spring force to force a ball valve element against a valve seat in the absence of pressure in said fluid flow lines above said predetermined value, and, when pressure in said fluid flow lines exceeds said predetermined value, urging said ball valve axially from said valve seat against said spring force, rotating said ball valve element such that fluid flows through said ball valve element to relieve said excessive pressure, and when said pressure falls beneath said predetermined value, said spring force provides a restoring force to return the ball valve element into sealing engagement with said valve seat.

* * * * *